April 24, 1951 S. W. BENSON 2,549,766
FASTENING MEANS FOR SUPPORTING OBJECTS
Filed April 1, 1948

INVENTOR.
SIDNEY W. BENSON,
BY
ATTORNEY.

Patented Apr. 24, 1951

2,549,766

UNITED STATES PATENT OFFICE 2,549,766

FASTENING MEANS FOR SUPPORTING OBJECTS

Sidney W. Benson, Los Angeles, Calif.

Application April 1, 1948, Serial No. 18,305

10 Claims. (Cl. 248—29)

My invention relates generally to fastening means for securing and suspending objects on ceilings, walls and other supporting surfaces, and more particularly to a device of the nature described which is suitable for hanging pictures and other ornamental and utilitarian objects from walls.

In the past, it has been usual practice to support pictures and other ornamental objects from hooks or pins driven into the supporting wall. Such procedure has many obvious disadvantages. First of all, the nail or hook which is driven or screwed into the walls always produces some damage to the latter, and if driven into plaster walls, for example, may produce a large blemish or crack in the wall, requiring considerable trouble and expense to repair. Furthermore, nails or screws driven into a plaster wall are far from secure and may become dislodged upon the application of any downward pressure thereto. Still further, there are many materials used in the construction of modern homes to which conventional screw hooks or nails cannot be attached. Such materials are, for example, glass brick, metal, tile, and terrazzo.

Attempts have been made in the past to secure hanging objects by means of permanent adhesives, such as polymorphous glues and the like. These materials have the disadvantage, however, that they take a permanent set and are difficult to remove from the supporting surface, often tearing away the paint surface, if such is present, and even affecting the glaze of such materials as tile and terrazzo.

Bearing in mind the disadvantages of conventionally used supporting means, it is a major object of my invention to provide an attachment device for hanging objects from walls, ceilings and other surfaces which may be readily attached to the supporting surface without marring the same.

It is another object of my invention to provide a device of the class described which may be removed from the supporting surface without damaging the same, and without requiring the use of special tools.

Still another object of my invention is to provide attachment means as described which may be attached to the supporting surface without the use of separately applied adhesives, nails, screws or special tools.

A still further object of my invention is to provide fastening means which may be secured to wall surfaces of materials such as glass brick, tile, metal, terrazzo, and the like.

The foregoing and other objects and advantages of my invention will become apparent from a consideration of the following description of several presently preferred embodiments thereof, such consideration being given also to the attached drawings in which.

Figure 1:
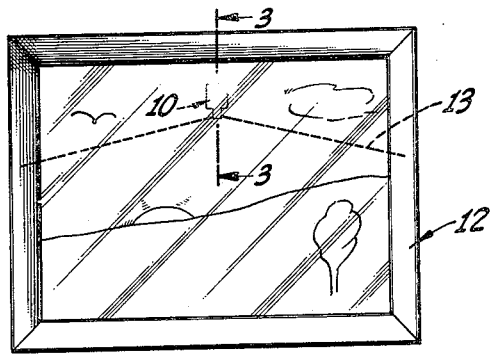
Figure 1 is an elevational view of a picture supported on a hanger embodying my invention.

Referring now to the drawings, and particularly to Figure 1 thereof, it will be seen that the device embodying my invention is identified by the reference character 10. The attachment device or hanger 10 is secured to a supporting wall 11, as will presently be described in more detail, and has suspended therefrom a picture 12, suspension being by the conventional picture wire 13 secured to the back of the picture frame.

Figure 2:
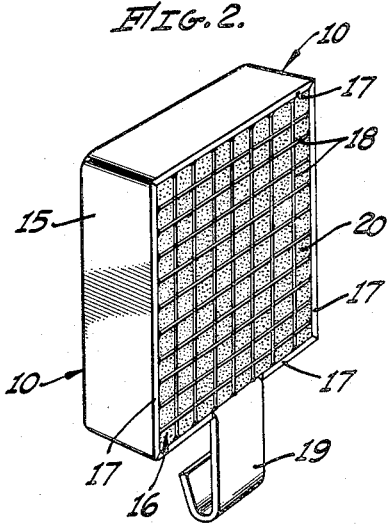
Figure 2 is a perspective view of the hanger employed in Figure 1.

Turning now to a discussion of a presently preferred form of the invention, reference is made to Figure 2. Here it will be seen that the hanger 10 comprises a folded up sheet metal housing 15 which may be constructed of brass, steel, aluminum, or any other of the commonly used construction metals. Alternately, the housing 15 may be constructed of a heat resistant thermosetting plastic material, such, for example, as Bakelite.

The housing 15 is, in the present instance, constructed in a flat, relatively shallow, rectangular box-like shape, having one vertical side thereof open, as indicated by the reference character 16. Secured across the open side of the housing 15, as, for example, by soldering to the edges 17, is a relatively large mesh wire screen 18. As in the case of the housing 15, the screen or grid 18 may be constructed either of metal wire or other heat resistant material so formed as to provide a foraminous surface or wall for the open side 16 of the housing 15.

Formed in one of the edges 17 and projecting downwardly therefrom is a supporting hook member 19, the purpose of which is to receive the picture suspending wire 13.

Within the housing 15 and entirely filling the interior volume thereof is a thermo-plastic resin of a type suited to withstand successive cycles of heating and cooling, and having a high adhesive strength, the purpose of the plastic resin 20 being to secure the entire attachment member 10 to the wall 11.

While a wide variety of thermo-plastic resins are suitable for use in devices embodying my invention, I have found that methyl methacrylate resin containing little or no plasticiser, meets all the above requirements. Other materials which will serve the same purpose are polyvinyl acetate resin, and, to some extent, common shellac.

It will be understood, of course, that I am not limited to the above named plastic materials in the practice of my invention. Any thermo-plastic material possessing a relatively high degree of adhesive strength, having a relatively low softening point (between approximately 40° centigrade and 200° centigrade), having a relatively low degree of brittleness, and having little or no tendency to deteriorate with age, is suitable for use within the housing 15.

The hanger 10 embodying my invention is secured to a wall by first heating the housing 15 until the plastic material 20 therein has been thoroughly softened. This may be conveniently accomplished by holding the device in a horizontal position with the open side 16 uppermost and applying heat to the flat surface 21, using a flame or electric heater as desired. If the housing 15 and the grid 18 are constructed of metal, they will materially assist in conducting the heat to all parts of the plastic material 20, thus facilitating and accelerating the softening process. It should be noted at this point that, due to the fact that the housing 15 contains a substantial quantity of plastic material 20, the thermal expansion of the latter is effective to force some of the material outwardly through the meshes of the grid 18.

When the plastic material has been thoroughly softened, the hanger 10 is pressed against the supporting surface 11 in the desired position and held for a few moments until the plastic material 20 hardens by cooling.

Figure 3:
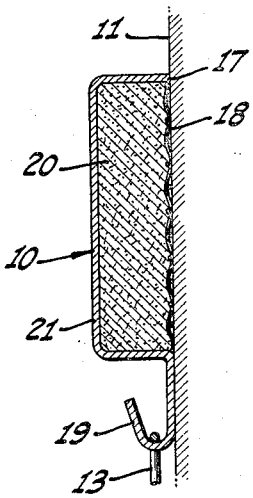
Figure 3 is an enlarged elevational section taken on the line 3—3 in Figure 1, showing the attachment member or hanger secured to a supporting wall.

The wire screen or grid 18 which is secured to the open face of the housing 15 serves to greatly reinforce the plastic material 20 immediately adjacent the plane of adherence, to the wall surface 11. Thus when the hanger 10 is secured in place, as illustrated in Figure 3, the grid 18 is, in effect, embedded in the plastic material 20 by reason of the fact that the latter material tends to pass outwardly through the meshes of the grid 18 when the hanger 10 is heated and pressed in place.

The flat wall 21 of the housing 15 may, if desired, be made relatively thin whereby to act somewhat in the nature of a diaphragm, so that when pressure is applied adjacent the center of the rear surface 21, the plastic material 20 is squeezed out through the meshes of the grid 18 into intimate contact with the supporting surface 11.

When it is desired to remove the hanger 10 for any reason, this may be done by again heating the back of the housing 15 with a match, cigarette lighter, electric iron or other heating means until the plastic material 20 is again softened, at which time the hanger 10 may be easily removed without damage to the wall 11. The wire grid 18 prevents any large mass of plastic material 20 from adhering to the wall, and such material as does adhere may be removed by means of a cloth dampened in a suitable solvent. After such removal, the attachment members can be re-used by again heating the housing 15 and reapplying in the manner above described.

Figure 4:
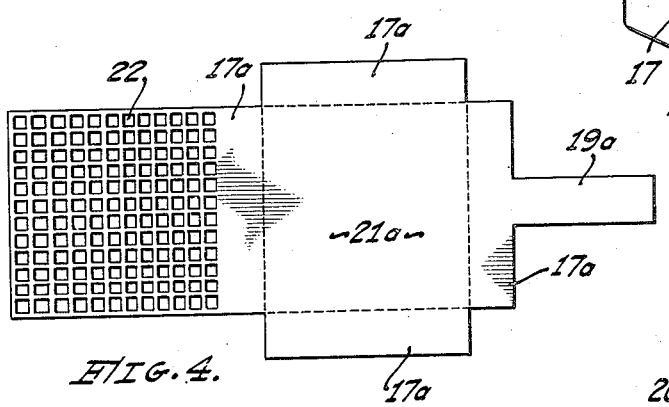
Figure 4 is a developed view of the sheet metal housing employed in a modified form of attachment member embodying my invention.

In Figure 4, I have illustrated a sheet metal blank from which a housing may be formed in which a grid corresponding to the wire screen 18 is formed integrally with the housing itself. The form illustrated in Figure 4 comprises a relatively large square central portion 21a corresponding to the rear wall 21 of the device illustrated in Figure 3, four edge flaps 17a integrally formed therewith and adapted to be folded up to form the sides or edges 17, a projecting lug portion 19a from which a hook member, corresponding to the hook 19, may be formed, and a grill portion 22 formed as an integral and perforated extension of one of the flaps 17a. The form shown in Figure 4 may be stamped out in a single punch press operation, folded up into a box form similar to the attachment member 10 and filled with plastic material 20 as in the previous embodiment.

Figure 5:
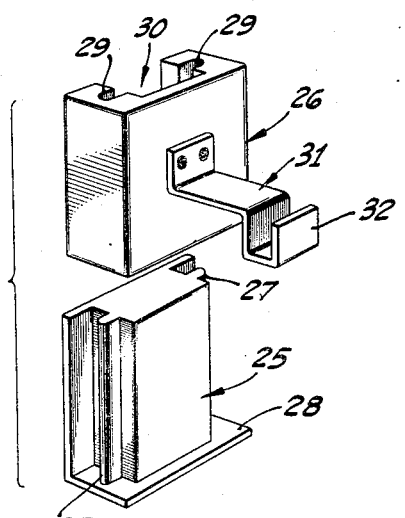
Figure 5 is a perspective view of yet another modified form showing a pair of cooperative attachment members embodying my invention and adapted to be used in the support of curtain brackets and similar members.

In Figure 5, I have illustrated a separable attachment device comprising a fixed member 25 and a removable member 26 adapted to have sliding engagement with the fixed member 25. The interior of the fixed member 25 is hollow, as in the case of the previous embodiments, the open face being rearwardly disposed and not shown in Figure 5. The interior of the fixed member 25 is filled with plastic material 20, a grid similar to the wire screen 18 or to the foraminous sheet 22 is provided, and the fixed member 25 is secured to a supporting surface in the same manner as that described in connection with the previous embodiments.

A pair of vertically extending parallel tongues 27 are formed along the sides of the fixed member 25 and a lower abutment 28 is also formed therein, whereby the removable member 26 may be slid vertically into place on the fixed member 25, the tongues 27 being received in parallel lateral grooves 29 formed in the interior surfaces of a channel-like recess 30 in the back of the removable member 26.

Secured to the front surface of the removable member 26 by spot welding, riveting, or other conventional fastening means, is a bracket 31 having a hook 32 formed in the outer end thereof whereby to receive a curtain rod, clothes hanger, or other object to be suspended from a supporting wall.

The form illustrated in Figure 5 has the advantage that the fixed portion 25 is relatively quickly and easily heated for the purpose of applying the same to a supporting surface, thus obviating the necessity of heating a relatively large member such as the removable portion 26. Another advantage of the form illustrated in Figure 5 is the fact that the removable portion 26 may be constructed of a non-heat resistant material since it does not have to be heated in order to apply the fixed portion 25 to the supporting wall or ceiling.

Still another advantage of the form shown in Figure 5 is that a single fixed portion 25 may be used in conjunction with a number of different types of removable portions, for example, in a kitchen where it may be desired to suspend, at different times, various utensils from the same fixed supporting member 25.

Thus, it will be seen that I have provided an attachment means which is suitable for suspending objects from walls of a wide variety of different materials. It will be seen further that attachment members embodying my invention may readily be removed from walls to which they are attached without marring the wall and without destroying the attachment member or preventing its re-use.

While I have illustrated the invention as embodied in a separate attachment member, it will be realized that these same principles may readily be incorporated directly into various articles of hardware, such as towel bar brackets, toothbrush and tumbler holders, soap dishes, and other articles of hardware commonly attached to the tile walls of bathrooms. Articles of hardware incorporating my invention as an integral part thereof may readily be removed and replaced when necessary without defacing the wall surface to which they are attached. This is of particular advantage in the case of tile surfaced walls in that such walls are almost impossible to repair without leaving a defacing scar.

While the forms shown and described herein are fully capable of achieving the objects and providing the advantages hereinbefore stated, it will be realized that they are capable of considerable modification without departing from the spirit of the invention. For this reason, I do not mean to be limited to the forms shown and described, but rather to the scope of the appended claims.

I claim:

1. In an attachment member of the class described, the combination of: means forming an open-sided enclosure of heat resistant material; means forming a foraminous wall across said open side; a body of thermo-plastic material in said enclosure adapted to be softened by heat applied to said enclosure means whereby said member may be secured to a surface by the adhesive quality of said material; and means formed in said enclosure means to engage and support an object from said surface.

2. In an attachment member of the class described, the combination of: means forming an open-sided enclosure of heat resistant material; means forming a foraminous wall across said open side; a body of thermo-plastic material in said enclosure adapted to be softened and forced through said foraminous wall by heat applied to said enclosure means whereby said member may be secured to a surface by the adhesive quality of said material; and means formed in said enclosure means to engage and support an object from said surface.

3. In an article of hardware adapted to be secured against a supporting wall: means forming a cavity opening in a wall-adjacent surface of said article; a foraminous wall across said opening; and a body of thermo-plastic adhesive material in said cavity.

4. A hanger of the type adapted to be secured to a wall to support an object therefrom comprising in combination: a relatively shallow housing constructed of heat conductive, heat resistant material, said housing having an open side adapted to be placed against said wall and an integrally formed member adapted to engage and support an object from said housing; and a body of thermo-plastic material in said housing adapted to be softened by heat applied to said housing whereby to adhesively secure said housing to said wall.

5. A hanger of the type adapted to be secured to a wall to support an object therefrom comprising in combination: a relatively shallow housing constructed of heat conductive, heat resistant material, said housing having a foraminous wall adapted to be placed against said supporting wall, and an integrally formed member adapted to engage and support said object from said housing; and a body of thermo-plastic material in said housing adapted to be softened by heat applied to said housing whereby to pass through said foraminous wall and adhesively secure said housing to said supporting wall.

6. In an article of hardware adapted to be secured against a supporting wall: means forming a cavity opening in a wall-adjacent surface of said article; a foraminous wall across said opening; and a body of thermo-plastic resin in said cavity, said resin having a softening point between 40° and 200° centigrade, and being relatively adhesive when in a softened state.

7. In an article of hardware adapted to be secured against a wall: means forming a cavity opening in a wall-adjacent surface of said article; a foraminous wall across said opening; and a body of methyl methacrylate resin in said cavity.

8. A hanger of the type adapted to be secured to a wall to support an object therefrom, comprising in combination: a relatively shallow sheet metal housing, said housing having an open side adapted to be placed against said wall; a wire grid positioned across said open side and secured to the adjacent edges of said housing in heat transfer relation therewith; a downwardly extending and outwardly bent tab formed in a lower edge of said housing adapted to engage and support an object from said housing; and a body of thermo-plastic resin substantially filling said housing, said resin being adapted to be softened and become adhesive upon application of heat to said housing whereby said housing may be secured to said wall by pressing the same thereagainst and allowing said resin to cool.

9. A hanger of the type adapted to be secured to a supporting wall to support an object therefrom, comprising in combination: a completely enclosed folded sheet metal housing having a perforated wall adapted to be placed in contact with said supporting wall; and a body of thermoplastic resin in said housing, said resin being adapted to be softened by heat applied to said housing and to expand under the influence of said heat whereby to pass through said perforated wall and cause said housing to adhere to said supporting wall.

10. An article of hardware adapted to be secured against a supporting wall, comprising in combination: a fixed member including means forming an open-sided enclosure, a foraminous wall across said open side and secured to said enclosure means in heat transfer relation therewith, and a body of adhesive thermo-plastic material in said enclosure adapted to be softened by heat applied to said enclosure means whereby to adhesively secure said fixed member to said supporting wall; and a removable member adapted for sliding engagement with said fixed member, said removable member having an object-supporting portion projecting therefrom whereby said removable member may be slidingly engaged with said fixed member to support an object adjacent said supporting wall.

SIDNEY W. BENSON.

REFERENCES CITED

The following references are of record in the file of this patent:

UNITED STATES PATENTS

| Number | Name | Date |
| --- | --- | --- |
| 2,096,750 | Lawrence | Oct. 26, 1937 |
| 2,122,999 | Burke | July 5, 1938 |
| 2,385,296 | Moore | Sept. 18, 1945 |